United States Patent
Witzel et al.

(10) Patent No.: US 8,253,576 B2
(45) Date of Patent: *Aug. 28, 2012

(54) SEARCH AND RESCUE USING ULTRAVIOLET RADIATION

(75) Inventors: John George Witzel, Alexandria, VA (US); Benjamin P. Dolgin, Alexandria, VA (US); Steven Cotten, Dumfries, VA (US); Michael Andrew Brennan, Bristow, VA (US); Jorge Gutierrez, Woodstock, VA (US); William Suliga, Manassas, VA (US)

(73) Assignee: Raytheon Company, Waltham, MA (US)

( * ) Notice: Subject to any disclaimer, the term of this patent is extended or adjusted under 35 U.S.C. 154(b) by 426 days.

This patent is subject to a terminal disclaimer.

(21) Appl. No.: 12/554,527

(22) Filed: Sep. 4, 2009

(65) Prior Publication Data

US 2011/0057804 A1 Mar. 10, 2011

(51) Int. Cl.
*G08B 17/12* (2006.01)
(52) U.S. Cl. ............. 340/600; 340/573.6; 340/573.4; 340/984
(58) Field of Classification Search .......... 340/600
See application file for complete search history.

(56) References Cited

U.S. PATENT DOCUMENTS

| | | | |
|---|---|---|---|
| 2,944,152 A | 7/1960 | Johnson et al. | |
| 3,648,045 A | 3/1972 | Le Vantine et al. | |
| 3,723,745 A | 3/1973 | Fletcher et al. | |
| 3,803,463 A | 4/1974 | Cover | |
| 4,253,132 A | 2/1981 | Cover | |
| 4,376,892 A | 3/1983 | Charpak et al. | |
| 4,493,114 A | 1/1985 | Geller et al. | |
| 4,731,881 A | 3/1988 | Geller | |
| 5,021,668 A | 6/1991 | Talmore et al. | |
| 5,062,154 A | 10/1991 | Geller et al. | |
| 5,191,460 A | 3/1993 | Lapatovich | |
| 5,266,958 A | 11/1993 | Durboraw, III | |
| 5,301,051 A | 4/1994 | Geller | |
| 5,307,194 A | 4/1994 | Hatton et al. | |
| 5,381,098 A | 1/1995 | Loftness | |
| 5,430,604 A | 7/1995 | Wong | |
| 5,468,963 A | 11/1995 | Bishop | |
| 5,719,567 A | 2/1998 | Norris | |
| 5,886,635 A * | 3/1999 | Landa et al. | 340/573.6 |
| 5,929,788 A * | 7/1999 | Vukosic | 340/908.1 |

(Continued)

FOREIGN PATENT DOCUMENTS

WO     WO 96/38831     12/1996

(Continued)

OTHER PUBLICATIONS

Notification of Transmittal of the International Search Report and the Written Opinion of the International Searching Authority, or the Declaration, PCT/US2010/046285, date of mailing Nov. 12, 2010, 4 pages.

(Continued)

*Primary Examiner* — George Bugg
*Assistant Examiner* — Kerri McNally
(74) *Attorney, Agent, or Firm* — Daly, Crowley, Mofford & Durkee, LLP

(57) ABSTRACT

A system for search and rescue includes a rescue beacon including a radiation source to emit radiation, at least a portion of which includes ultraviolet c-band radiation, and an ultraviolet c-band detector to detect the ultraviolet c-band radiation to enable locating of the rescue beacon.

13 Claims, 6 Drawing Sheets

U.S. PATENT DOCUMENTS

| | | | |
|---|---|---|---|
| 6,104,297 | A | 8/2000 | Danilychev |
| 6,380,871 | B1 | 4/2002 | Kaplan |
| 6,693,561 | B2 | 2/2004 | Kaplan |
| 6,954,591 | B2 | 10/2005 | Lupton et al. |
| 2001/0029882 | A1 | 10/2001 | Pharo et al. |
| 2002/0104472 | A1 | 8/2002 | Neubert |
| 2003/0079671 | A1 | 5/2003 | Ichikawa et al. |
| 2003/0150371 | A1 | 8/2003 | Snider |
| 2004/0004826 | A1 | 1/2004 | Wakaki et al. |
| 2004/0089219 | A1 | 5/2004 | Burau et al. |
| 2004/0149199 | A1 | 8/2004 | Frank et al. |
| 2005/0078557 | A1 | 4/2005 | Andersen |
| 2005/0125926 | A1 | 6/2005 | Rekum et al. |
| 2005/0139142 | A1 | 6/2005 | Kelley et al. |
| 2005/0160963 | A1 | 7/2005 | Siikaluoma et al. |
| 2005/0217558 | A1 | 10/2005 | Fitzer et al. |
| 2005/0253927 | A1 | 11/2005 | Allik et al. |
| 2005/0270175 | A1 | 12/2005 | Peddie et al. |
| 2006/0065183 | A1 | 3/2006 | Drummond et al. |
| 2006/0164252 | A1 | 7/2006 | Richmond |
| 2006/0169193 | A1 | 8/2006 | Mack et al. |
| 2006/0174812 | A1 | 8/2006 | Marszalek et al. |
| 2006/0260533 | A1 | 11/2006 | Parias |
| 2006/0273087 | A1 | 12/2006 | Crawford |
| 2007/0012237 | A1 | 1/2007 | Nielsen |
| 2007/0044704 | A1 | 3/2007 | Osborne et al. |
| 2007/0098407 | A1 | 5/2007 | Hebrank et al. |
| 2007/0119364 | A1 | 5/2007 | Taylor et al. |
| 2007/0125296 | A1 | 6/2007 | Taylor et al. |
| 2007/0151502 | A1 | 7/2007 | Cooperman |
| 2007/0221863 | A1 | 9/2007 | Zipf |
| 2007/0253713 | A1 | 11/2007 | Reilly et al. |
| 2008/0000411 | A1 | 1/2008 | Easterwood |
| 2008/0022920 | A1 | 1/2008 | Custodis |
| 2008/0092800 | A1 | 4/2008 | Smith et al. |
| 2008/0110391 | A1 | 5/2008 | Taylor et al. |
| 2008/0140314 | A1 | 6/2008 | Park |
| 2008/0150764 | A1* | 6/2008 | Glasa et al. ............... 340/984 |
| 2008/0190354 | A1 | 8/2008 | Malpas et al. |
| 2008/0315116 | A1 | 12/2008 | Schweitzer |
| 2009/0010304 | A1 | 1/2009 | Skinner et al. |
| 2009/0145347 | A1 | 6/2009 | Nakamura et al. |
| 2009/0178608 | A1 | 7/2009 | Shaw et al. |
| 2009/0219160 | A1* | 9/2009 | Shervey et al. ............ 340/573.6 |
| 2009/0295310 | A1* | 12/2009 | Duerr et al. ................. 315/297 |

FOREIGN PATENT DOCUMENTS

| | | |
|---|---|---|
| WO | WO 96/38831 A1 | 12/1996 |
| WO | WO 00/23813 A1 | 4/2000 |
| WO | WO 2006/017910 A2 | 2/2006 |
| WO | WO 2006/017910 A3 | 2/2006 |
| WO | WO 2007/008738 A1 | 1/2007 |

OTHER PUBLICATIONS

Written Opinion of the International Searching Authority, PCT/US2010/046285, date of mailing Nov. 12, 2010, 5 pages.

Hamamatsu, Flame Sensor UV Tron® 2868. "Quick Detection of Flame from Distance, Compact UV Sensor with High Sensitivity and Wide Directivity, Suitable for Flame Detectors and Fire Alarms", 1997 Hamamatsu Photonics K.K., pp. 1-2, http://www.acroname.com/robotics/parts/R66-R2868.pdf, last visited Aug. 10, 2009.

"DayCor® Superb Corona Detection Systems Based on UV Solar Blind Technology" http://www.daycor.com/DayCor-Family/P-superb.html, 2 pages, last visited Aug 10, 2009.

U.S. Appl. No. 12/538,997, filed Aug. 11, 2009.

Utility U.S. Appl. No. 12/902,438, filed Oct. 12, 2010, 39 pages.

Notification of Transmittal of the International Search Report and the Written Opinion of the International Searching Authority, or the Declaration, PCT/US2011/052853, date of mailing Dec. 20, 2011, 5 pages.

Written Opinion of the International Searching Authority, PCT/US2011/052853, date of mailing Dec. 20, 2011, 6 pages.

Notification Concerning Transmittal of the International Preliminary Report on Patentability (Chapter I of the Patent Cooperation, PCT/US2010/046285, date of mailing Mar. 15, 2012, 2 pages.

Written Opinion of the International Searching Authority, PCT/US2010/046285, date of mailing Mar. 15, 2012, 4 pages.

\* cited by examiner

SEARCH AND RESCUE USING ULTRAVIOLET RADIATION

BACKGROUND

As is known in the art, Ultraviolet (UV) light is electromagnetic radiation with a wavelength shorter than that of visible light, but longer than x-rays. UV light includes wavelengths in the range of 100 to 400 nanometers (nm) and energies from 3 to 124 electron-volts. UV light is emitted by the Sun, electric arcs, and artificial light sources such as black lights. As an ionizing radiation, UV sources can cause chemical reactions that cause many substances to glow or fluoresce. Although UV light is beyond visible light, most people are aware of the effects of UV radiation through sunburn. However, the UV spectrum has many other effects, both beneficial and damaging, on human health.

UV radiation can be classified in a number of ways, including as bands of radiation separated into the following:
UV A-band: 400-320 nm.
UV B-band: 320-280 nm.
UV C-band: 280-200 nm.

The Sun emits UV A, UV B, and UV C-band radiation; however, the Earth atmosphere's ozone layer absorbs about 98.7% of this radiation, primarily in the UV B and UV C-bands. Other natural sources of UV radiation include lightning and fires.

As is also know in the art, ordinary glass is partially transparent to UV A-band radiation, but is opaque to shorter UV wavelengths in the UV B and UV C-bands. Silica or Quartz glass, depending on quality of materials, can be transparent to even UV C-band radiation, while window glass passes about 90% of UV light above 350 nm, but blocks over 90% of UV light below 300 nm.

UV radiation can be an effective viricide and bactericide and is used in wastewater treatment. However, it is only beginning to find usage in drinking water sterilization. UV lamps are used to sterilize workspaces and tools used in biology laboratories and medical facilities. In particular, UV light can be an effective germicide because it can prohibit reproduction by damaging cellular DNA, even though it may not kill a host organism.

As is also known in the art, UV C-band radiation is invisible to humans and to ordinary cameras, video gear, and night vision systems. Existing UV detectors generally include either solid-state devices, such as a silicon carbide or aluminum nitride device, or gas-filled tubes as sensing elements. UV detectors are primary used for detecting artificial light. For example, the petrochemical industry uses UV detectors to monitor burning hydrogen flames which radiate strongly in the 185-260 nm range. UV detectors are sensitive to burning compounds, such as hydrocarbons, metals, sulfur, hydrogen, hydrazine, and ammonia. Industrial safety applications employ UV detectors to effectively detect arc-welding, electrical arcs, lighting, and X-rays.

UV C-band cameras have been used to detect invisible coronas emanating from hot spots in high voltage power lines to identify potentially destructive electrical arcs (so called "flash-overs"). These cameras use special quartz or Calcium Fluoride lenses and have split optical paths to process and eventually combine visible and UV light into a visible image. The visible light follows a conventional video-camera path, while the UV light passes through a UV C-band transmissive optical path. The UV light then passes through a solar blind filter into a UV Intensified Charged Coupled Device (ICCD). Image recombination results in invisible UV radiation being rendered as visible light as an overlay on a standard video image. Typically, camera operators can see a bright cloud of UV C-band photons when viewing a UV C-band emissions source through a live UV C-band camera.

SUMMARY

Time is critical during recovery of downed or lost pilots or a man overboard (MOB) at sea, avalanche victims, lost hikers, as well as other recovery scenarios. Success in victim recovery may be measured in minutes due to rapid onset of hypothermia in a victim, exhaustion, drowning, dangerous terrain, or hostile encounters. In poor environmental conditions, rescue teams may fail to locate victims who wear (or are tethered to) search aides that require line-of-sight to locate and track. Moreover, many search aides are near impossible to locate and track from relatively large distances in the open ocean, and contact may be lost while rescue vessels come about and attempt to retrace a search.

Strobes are reasonably visible at distances of less than one mile in calm water at night. Unfortunately, strobes are less visible during the day and/or in poor weather when many incidents occur. Also, victims adrift at sea and/or on the move on land (e.g., to avoid dangerous conditions and/or hostile forces in the area) may be lost when rescue teams temporarily lose site of the victims. Ocean currents and winds can further impede efforts, causing lost victims to drift long distances.

The inventors realized that UV C-band radiation could be used during search and rescue operations to overcome many of these problems. In particular, the inventors realized that because UV C-band detectors are solar blind (the Earth's atmosphere blocks UV C-band radiation) UV C-band radiation could be used in a wide variety of environments, including outdoors and indoors, and day and night. Furthermore, UV C-band radiation is generally unaffected by inclement weather such as rain and fog, and dust and therefore can be used effectively under these otherwise problematic conditions. Another useful feature is that UV C-band radiation reflects well off water, soil, snow, and manmade surfaces, such as pavement and walls.

In general overview, the inventive concepts, techniques, and systems described herein may be used in search and rescue operations to locate and track a lost entity. More particularly, the inventive concepts, techniques, and systems involve the use of a UV C-band detector to locate and track a UV C-band radiation source that may be affixed and/or tethered to a lost victim or asset. The inventive concepts, techniques, and systems may be used to support search and rescue functions and in a way that overcomes many problems experienced in the conventional art.

Advantageously, in environments in which rescues teams much cover relatively large distances (such as to attempt to locate lost victims of a plane crash wherein rescue teams cannot pinpoint the exact location of the crash), the inventive concepts, techniques, and systems enable a lost entity to be located and tracked from relatively large distances. In one embodiment, a low power UV C-band radiation source may be visible for miles in every direction through line-of-sight (i.e. not occluded by any obstacles), reflected, and/or scattered airborne reflections of the radiation.

In a further embodiment, UV C-band radiation may be viewed through a hand-held UV C-band imager. In the same or different embodiment, rescue devices may be adapted to incorporate the inventive systems. For example, strobes which emit visible light in the range of about 400 nanometers (nm) to about 700 nm (such as from light emitting diodes) and/or infrared light above 700 nm may be adapted to incorporate UV C-band radiation sources and the UV C-band imager may be used to speed up and simplify search and rescue efforts. In applications which use strobes, a glass or plastic strobe cover that ordinarily blocks UV C-band radiation may be removed or replaced with another material that does not block strobe-emitted UV C-band radiation. In other instances, a strobe tube material may block UV C-band radiation, which can be replaced with another material that does not block UV C-band radiation.

In one aspect, a system for search and rescue includes a rescue beacon including a radiation source to emit radiation, at least a portion of which includes ultraviolet c-band radiation, and an ultraviolet c-band detector to detect the ultraviolet c-band radiation to enable locating of the rescue beacon.

In further embodiments, the system includes one or more of the following features: the rescue beacon is coupled to a moving body; the radiation source is an omni-directional radiation source; a substantial portion of the radiation is ultraviolet c-band radiation; the radiation source is at least one of: a light-emitting diode, and a gaseous discharge tube; the gaseous discharge tube is Xenon or a Mercury discharge tube; the ultraviolet c-band detector is a one-bit detector; a vibration-generator to vibrate in response to detected ultraviolet c-band radiation; the ultraviolet c-band detector is an imager; the imager renders an image to a user, the image including an ultraviolet c-band portion to represent the detected ultraviolet c-band radiation, and a visible light portion to represent an environment of the rescue beacon.

In another aspect, a method for search and rescue includes providing a rescue beacon including a radiation source, at least a portion of which includes ultraviolet c-band radiation, and detecting the ultraviolet c-band radiation using an ultraviolet c-band detector.

Further embodiments of the method include one or more of the following features: the rescue beacon is coupled to a moving body; the radiation source is an omni-directional radiation source; a substantial portion of the radiation is ultraviolet c-band radiation; the radiation source is at least one of: a light-emitting diode, and a gaseous discharge tube; the gaseous discharge tube is Xenon or a Mercury discharge tube; the ultraviolet c-band detector is a one-bit detector; generating a vibration stimulus in response to detected ultraviolet c-band radiation; the ultraviolet c-band detector is an imager; rendering an image to a user, the image including an ultraviolet c-band portion to represent the detected ultraviolet c-band radiation, and a visible light portion to represent an environment of the rescue beacon.

It will readily apparent to one of ordinary skill in the art that the inventive concepts, techniques, and systems are not limited to search and rescue operations. As by way of non-limiting examples, the inventive concepts, techniques, and systems may be used to locate and track moving and/or fixed beacons to support research operations and/or commercial endeavors and/or organizational functions. For example, UV radiation sources may be affixed to weather balloons to support meteorological reporting or to field devices to track commercial assets that may be detected by UV detectors.

BRIEF DESCRIPTION OF THE DRAWINGS

The foregoing features, as well as a detailed description, may be more fully understood from the following description of the drawings in which.

DETAILED DESCRIPTION

Before embarking on a detailed description of the inventive concepts, techniques, and systems described herein, it may be useful to provide a general overview of search and rescue operations and problems with conventional techniques and search aides such as lifejackets (which may include water-operated strobes lights, clip-on radio frequency devices, etc.) as well as other methods such as smoke signals, whistles, and flares.

Search and rescue efforts to locate victims such as downed pilots and/or a man-overboard (MOB) are often experience environmental and procedural impediments. In particular, obstacles and superficial characteristics of a search environment can impede rescue efforts. For example, choppy waves at sea, rugged terrain on land, inclement weather (including rain and fog), and distance can impede a direct line-of-sight from locators to victims that may be necessary to locate victims. Other surface characteristics, such as white caps on waves, can obscure victims, making it particularly difficult for rescue teams to spot victims. Other problems are caused when rescue teams lose sight of victims during so-called "come-about" operations when search vessels reverse direction.

Figure 1:
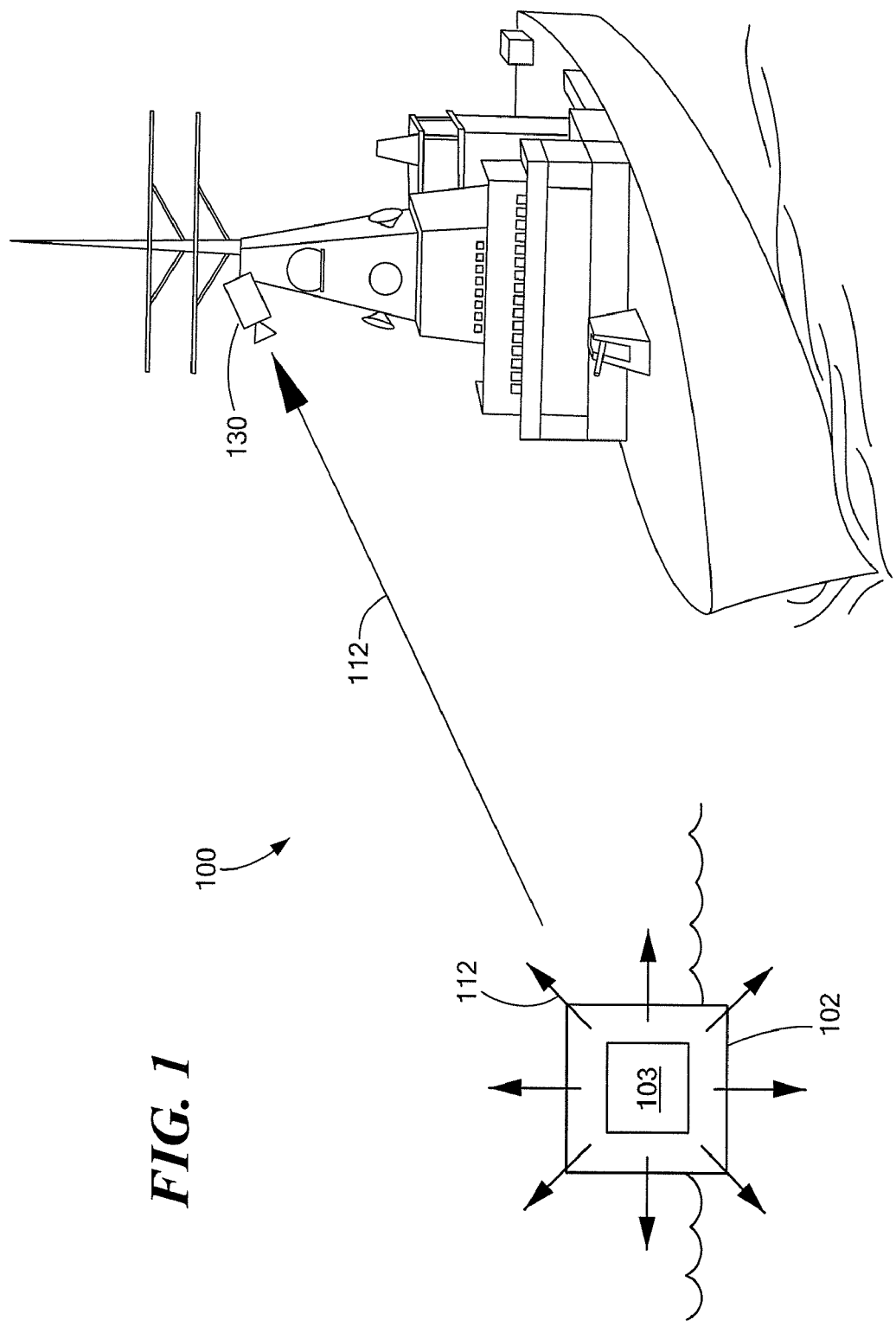
FIG. 1 is a pictorial representation of an embodiment of a search and rescue system according to the inventive concepts, techniques, and systems described herein.

Referring to FIG. 1, in accordance with an embodiment of the inventive concepts, systems, and techniques described herein, a system 100 for search and rescue includes a rescue beacon 102 including a radiation source 103 to emit radiation 112, at least a portion of which includes ultraviolet (UV) C-band radiation, and an UV C-band detector 130 to detect the UV C-band radiation to enable locating of the rescue beacon 102.

Figure 2:
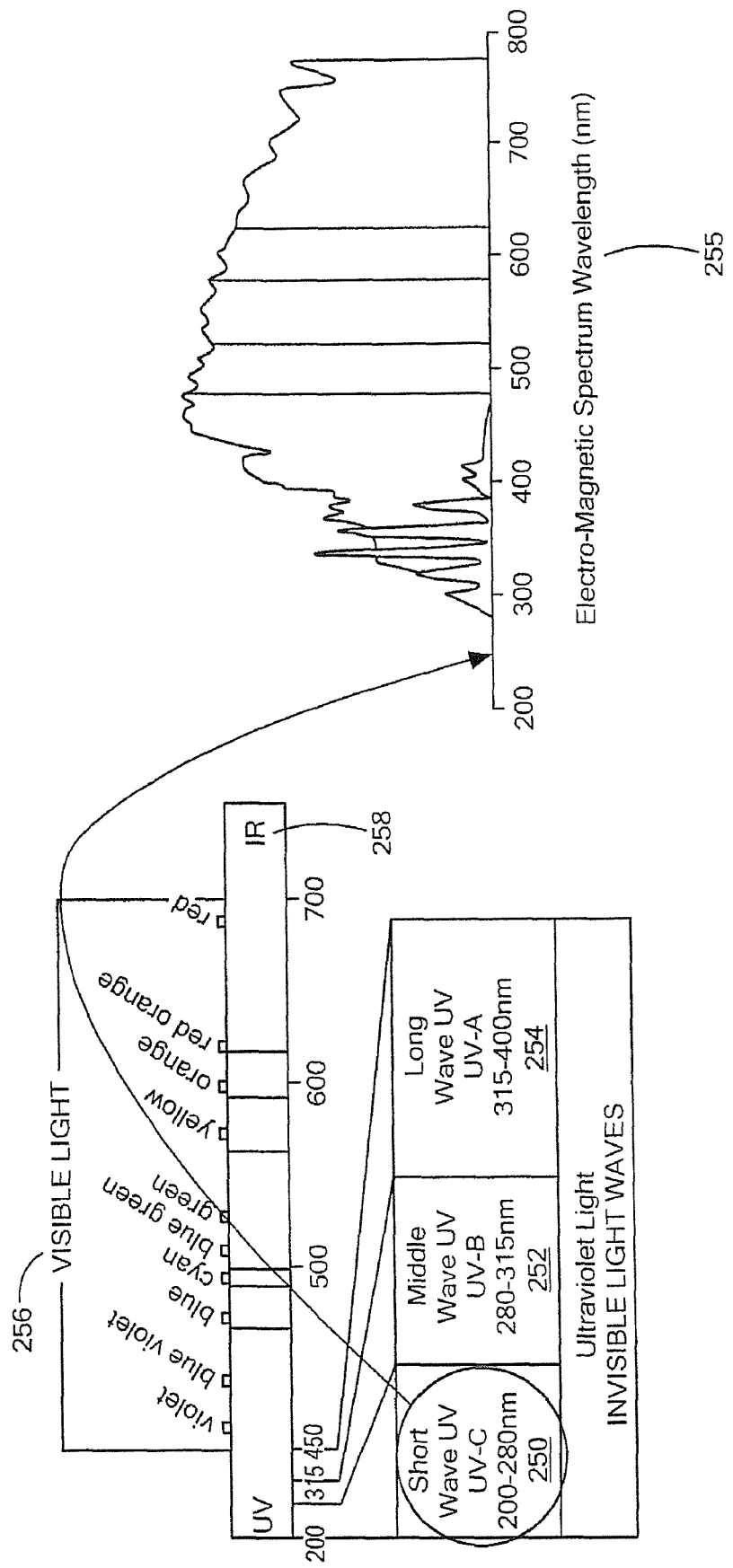
FIG. 2 is pictorial representation of the electromagnetic spectrum a portion of which includes UV C-band radiation.

The UV C-band radiation source 103 includes a device capable of emitting light, including light in the UV C-band radiation range. Referring to FIG. 2 illustrating the electromagnetic spectrum 255, in a further embodiment, a substantial portion of the emitted light (e.g., at least 80% of the emitted light) is within the UV C-band radiation range 250 of the electromagnetic spectrum 255 relative to light emitted in a UV B-band 252, UV A-band 254, visible range 256, and infrared range 258. As can be seen in FIG. 2, UV C-band radiation 250 is within the range of about 200 nm to about 280 nm.

Referring again to FIG. 1, as non-limiting examples, a radiation source 103 may include a solid state device, such as a silicon carbide or aluminum nitride device, or a gas-filled tube. In another non-limiting example, a UV C-band radiation source 103 may include a UV C-band light emitting diode or a gaseous low or medium pressure Xenon and/or Mercury discharge tube. Such a tube may include strobe lights which may be low cost and long-lived devices. Other radiation sources include a laser diode and other types of gaseous mixtures in gaseous discharge tubes.

The UV C-band radiation detector 130 includes a device capable of detecting light, including light in the UV C-band radiation range. As non-limiting examples, a detector 130 may include a one-bit UV C-band detector, a non-limiting example of which is the UVTron R2868 manufactured by Hamamatsu Photonics K.K. of Iwata-City, Shizuoka Pref., Japan, capable of detecting light in the range of about 185 nm to about 260 nm. In a further embodiment, the detector 130 includes a UV C-band imager, a non-limiting example of which is the DayCor© Superb manufactured by Ofil Ltd. of Nes-Ziona, Israel, which is a sensitive bi-spectral visible light and UV C-band detection apparatus with absolute solar blind performance and with high pinpointing resolution. It will be understood by one of ordinary skill in the art that the detector 130 is not limited to the above-described embodiments and can include other types of UV C-band radiation detectors.

In further embodiment, a UV C-band detector 130 includes a one-bit detector, as may be similar to the one-bit UVTron detector described above, and a vibration-generator to generate a vibration stimulus in response to detected UV C-band radiation. As by way of a non-limiting example, the vibration-generator may be a vibrating motor. The vibration generator may intensify and/or diminish the vibration stimulus in response to an amount of detected UV C-band radiation. For example, the vibration stimulus may intensify in response to a relatively intense UV C-band radiation source.

Such a detector 103 may be included in a hand-held device that vibrates in response to detected UV C-band radiation. Advantageously, such a detector 103 is relatively simple and low cost, yet can effectively communicate the presence and/or location of UV C-band radiation to a user. For example, the detector 103 may vibrate when the user points the hand-held device directly at the UV C-band radiation source 102. In other instances, the detector 103 may vibrate in response to scattered UV C-band radiation, such as radiation scattered by dust particles, and/or reflected UV C-band radiation, such as radiation reflected off water. Although scattered and reflected UV C-band radiation may not indicate a precise source and location of the UV C-band radiation, it can indicate a general direction of the source to narrow the search space.

In further embodiments, a UV C-band detector 130 further includes an audio-generator device and/or a visual-generator device to generate respective audio and visual stimuli in response to detected UV C-band radiation. These devices may further be combined with the above-described vibration-generator device.

Figure 3A:
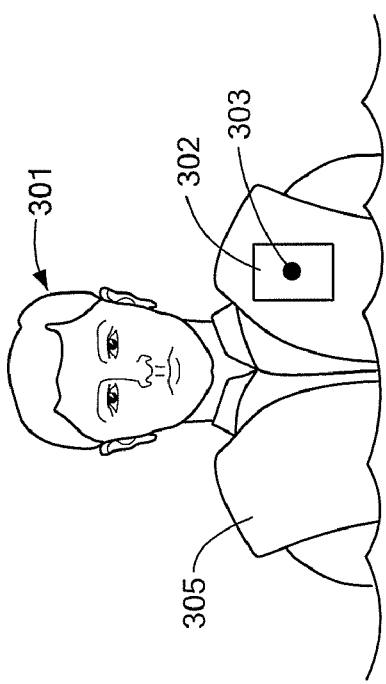
FIG. 3A is a pictorial representation of an embodiment of a rescue beacon according to the inventive concepts, techniques, and systems described herein.
Figure 3B:
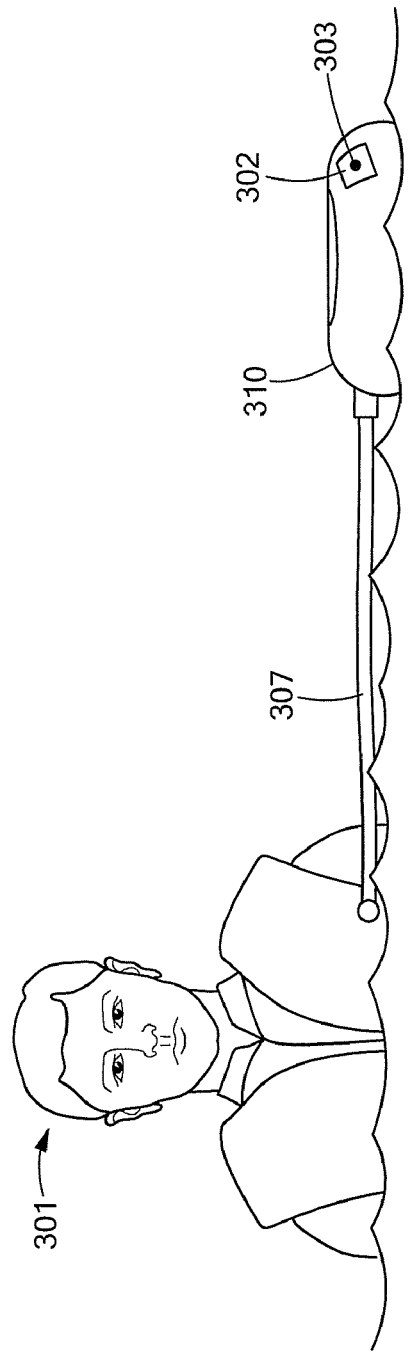
FIG. 3B is a pictorial representation of another embodiment of a rescue beacon according to the inventive concepts, techniques, and systems described herein.

Referring now to FIGS. 3A and 3B, in which like elements have like reference designations, in a further embodiment, a rescue beacon 302 including a UV C-band radiation source 303, as may be similar to rescue beacon 102 and radiation source 103 described above in conjunction with FIG. 1, is coupled to a lifejacket 305 (FIG. 3A) worn by a victim 301. In other embodiments, the rescue beacon 102 may be coupled to a life ring or throwable man-overboard marker 310 (FIG. 3B), which may be tethered 307 to the victim 301. A variety of methods may be used to couple the rescue beacon 302 to these devices including, but not limited to, providing a mechanical device such as a fastener (non-limiting examples of which include a rivet, clip, staple), or chemically, such as with an epoxy, or a combination thereof.

Figure 3C:
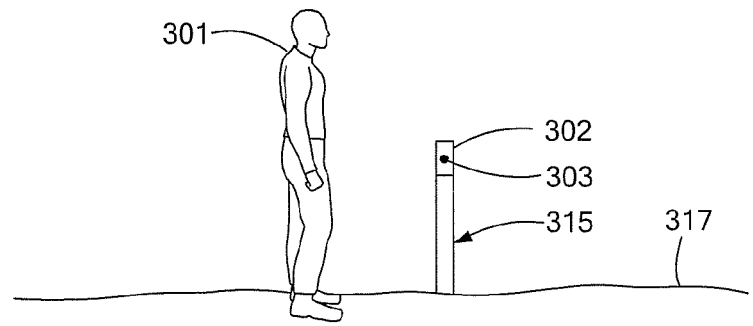
FIG. 3C is a pictorial representation a yet another embodiment of a rescue beacon according to the inventive concepts, techniques, and systems described herein.

Referring to FIG. 3C, in which like elements of FIGS. 3A and 3B have like reference designations, in another embodiment, the rescue beacon 302 is a fixed body. As by non-limiting examples, the rescue beacon may be a pole 315 inserted into the ground 317, a permanent support structure such as a tower, or any other fixed body. In this embodiment, a rescue victim 301 may remain in the vicinity of the rescue beacon 302 so that rescue teams can locate the victim 301.

In another embodiment, the rescue beacon 302 is a moving body. As by way of non-limiting examples, the rescue beacon 302 may be a floatation device that moves along with surface waves, ocean currents, and/or drifts by wind forces, or may be coupled to a moving vehicle or moving lost victim. In the latter, the lost victim may move to avoid hostile forces, to seek shelter, and/or to avoid unsafe environmental conditions (such as steep terrain). In the same or different embodiment, the rescue beacon 302 may be temporarily fixed and move only at certain times or during certain events, for example, due to unstable ground. For example, the rescue beacon 302 may be situated within an unstable snow bank and may temporarily move during an avalanche or due to settling, melting, and/or freezing ice and snow.

Figure 3D:
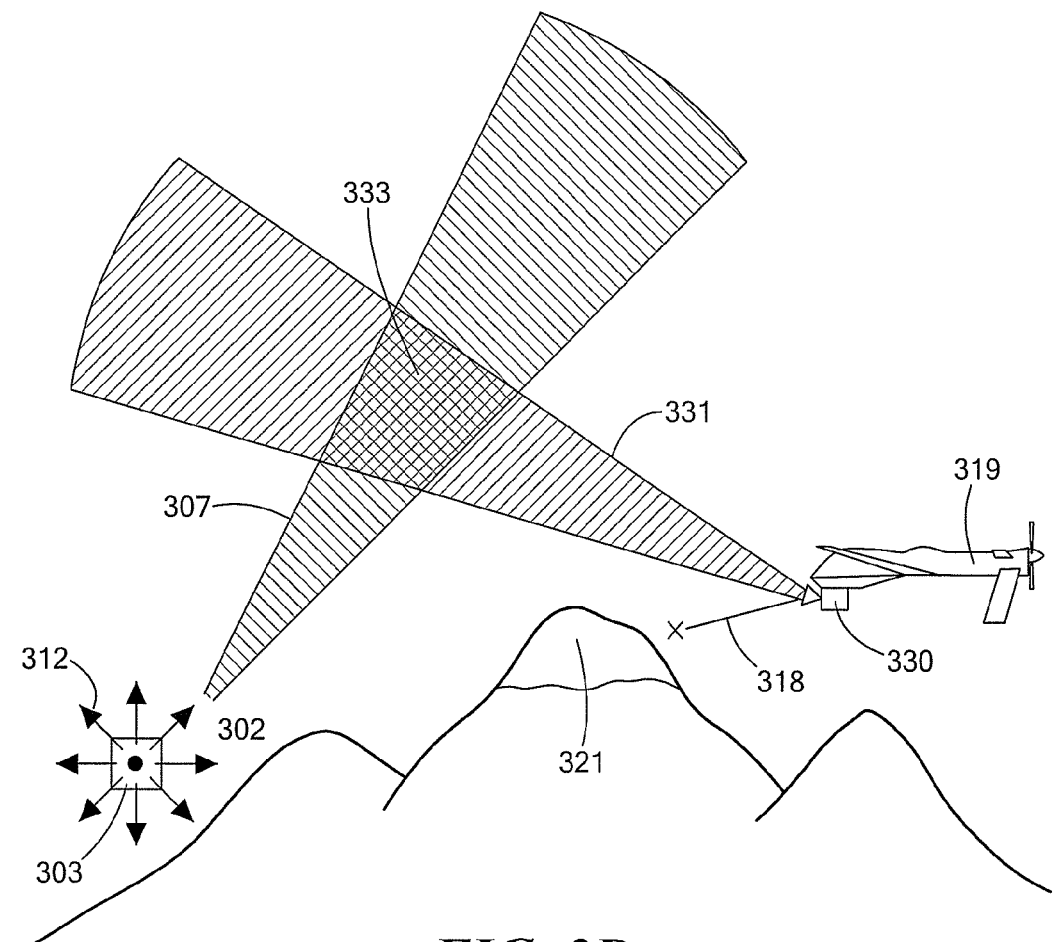
FIG. 3D is a pictorial representation of a search and rescue environment which includes an embodiment of the inventive concepts, techniques, and systems described herein.

Referring now to FIG. 3D, in which like elements of FIGS. 3A and 3B have like reference designations, in a further embodiment, the radiation source 303 is an omni-directional radiation source 312. An omni-directional radiation source is a radiation source that emits light substantially equally in all directions around the source. Advantageously, such a radiation source can be detected from a wide-variety of directions including from a UV C-band detector mounted on a vehicle that is approaching the radiation source and/or retreating from the radiation source.

When combined with UV C-band radiation's reflective characteristics, the radiation source 303 may be detected regardless of whether or not the radiation source is within a line-of-sight 318 of a rescue vehicle 319. As can be seen in FIG. 3D, the line-of-sight 318 between the rescue vehicle 319 and the rescue beacon 302 is blocked by a mountain top 321. However, the rescue beacon 302 may be detected as long as a portion of a field-of-view 331 of a UV C-band detector 330 overlaps 333 with a portion of a field of transmitted UV C-band radiation 307 from the UV C-band source 303.

Figure 3E:
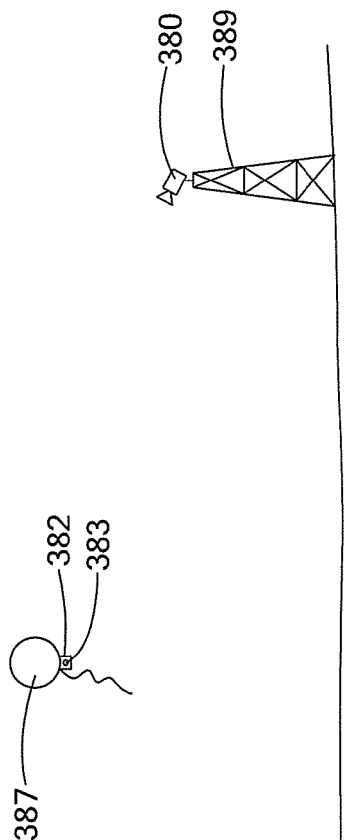
FIG. 3E is a pictorial representation of research environment that may use an embodiment of the inventive concepts, techniques, and systems described herein.

It will be readily apparent to one of ordinary skill in the art that the inventive concepts, techniques, and systems are not limited to applications in search and rescue operations. As by way of non-limiting examples, the inventive concepts, techniques, and systems may be used to locate and track moving and/or fixed beacons to support research operations and/or commercial endeavors and/or organizational functions. Referring now to FIG. 3E, for example, a beacon 382 including a UV radiation source 383 may be affixed to a weather balloon 387 to support meteorological operations. In this example, a UV detector 380 may be mounted to a tower 389. In one or more commercial application, the inventive concepts, techniques, and system may be used to track assets.

Figure 3F:
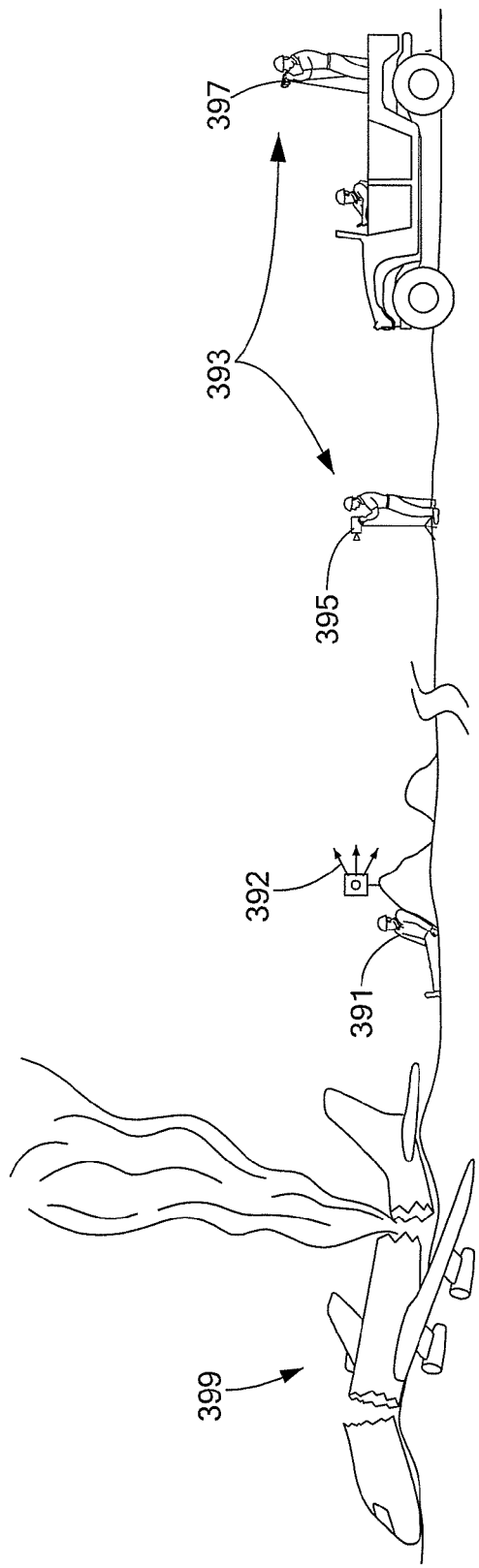
FIG. 3F is a pictorial representation of yet another search and rescue environment that may use an embodiment of the inventive concepts, techniques, and systems described herein.

As described throughout this application, UV C-band radiation is within the range of about 200 nm to about 280 nm. Referring to FIG. 3F, advantageously, such emitted light 392 cannot be detected by visible light detecting cameras 395 and/or other optical devices including monocular or binocular telescopes 397 often found in the art. In this way, the inventive concepts, techniques, and systems may help thwart hostile forces 393 that typically use these devices 395, 397 to attempt to locate, capture, and/or neutralize a lost or downed victim 391 such as a downed-pilot involved in a plane crash 399.

Figure 4:
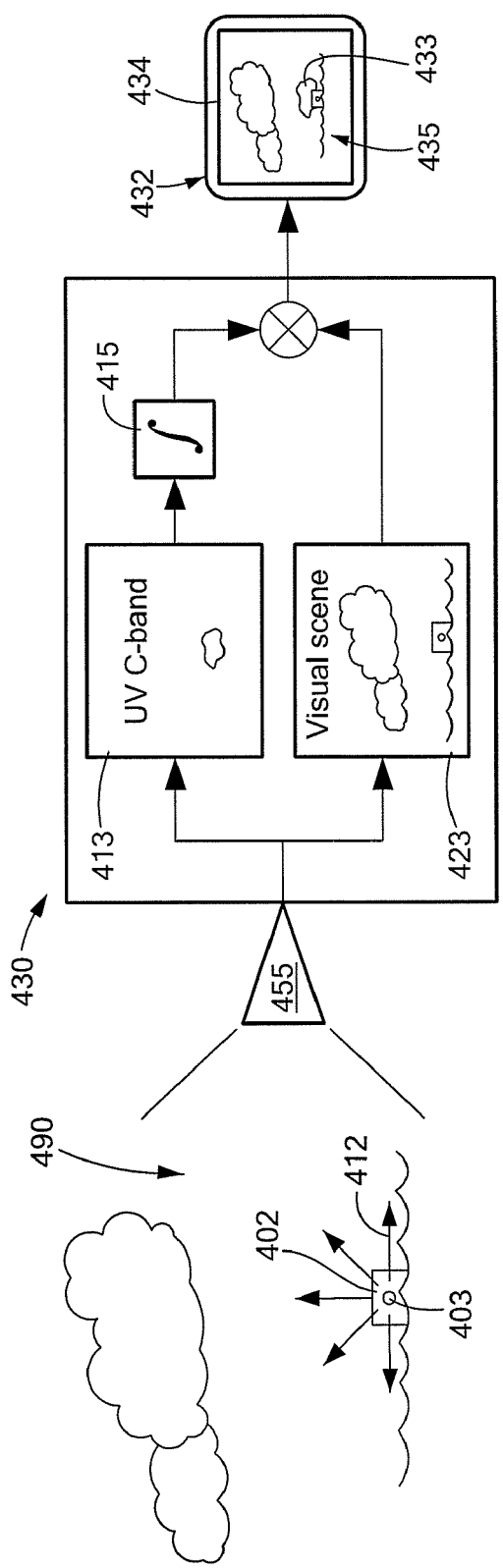
FIG. 4 is a pictorial representation of an embodiment of an ultraviolet (UV) C-band imager of the type which may be used in the system of FIG. 1.

Referring now to FIG. 4, in a further embodiment the inventive concepts, techniques, and systems include an imager 430 capable of detecting UV C-band radiation 412 emitted by a UV C-band radiation source 403 and visible light present within an environment 490. The imager 430 generates an image 434 on a display device 432 that includes the detected UV C-band radiation 413 and the visual scene of the environment 423. The imager 430 may include objective UV and/or zoom lenses, mirrors, and other components, generally denoted by reference numeral 455.

In a further embodiment, the detected UV C-band image 413 is transformed 415 to appear as a visual component 433 of the displayed image 434 which may overlap other displayed objects 435 present within the environment 490. In this way, rescue teams can locate and track a rescue beacon 402, as may be similar to rescue beacon 102 described in conjunction with FIG. 1.

Figure 5:
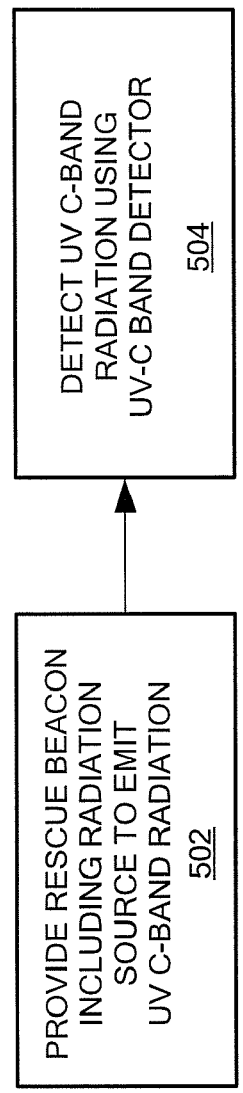
FIG. 5 is a flow diagram of an embodiment of an inventive method described herein for search and rescue.

Referring now to FIG. 5, a method 500 for search and rescue includes providing a rescue beacon 502 which includes an ultraviolet c-band radiation source to emit UV C-band radiation, and detecting the ultraviolet c-band radiation 504 using an ultraviolet c-band detector. In a further embodiment, the method 500 includes providing a radiation scanner to automatically sweep and monitor a wide search area, for example, a 360 degree search area surrounding a rescue vessel.

In the same or different embodiment, the method 500 includes providing a UV C-band radiation reflector to reflect UV C-band radiation from a wide search area to the UV C-band detector. For example, the UV C-band reflector may include a mirror capable of reflecting UV C-band radiation toward the detector. Such a mirror may be rotatably coupled to the above-described scanner to reflect UV C-band radiation substantially equally from all directions toward the detector.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A system for search and rescue, comprising:
a rescue beacon coupled to a moving body, comprising:
an omni-directional radiation source to emit radiation about the rescue beacon, at least a portion of which includes ultraviolet c-band radiation;
a one-bit ultraviolet c-band detector to detect the ultraviolet c-band radiation to enable locating of the rescue beacon; and
a stimulus generator that generates a stimulus in response to detected ultraviolet c-band radiation,
wherein the stimulus generator is one of: a vibration generator, an audio generator, and a visual generator.

2. The system of claim 1, wherein a substantial portion of the radiation is ultraviolet c-band radiation.

3. The system of claim 1, wherein the radiation source is at least one of: a light-emitting diode, and a gaseous discharge tube.

4. The system of claim 3, wherein the gaseous discharge tube is Xenon or a Mercury discharge tube.

5. The system of claim 1, wherein the ultraviolet c-band detector is an imager.

6. The system of claim 5, wherein the imager renders an image to a user, the image comprising:
an ultraviolet c-band portion to represent the detected ultraviolet c-band radiation; and
a visible light portion to represent an environment of the rescue beacon.

7. A method for search and rescue, comprising:
providing a rescue beacon coupled to a moving body, comprising:
an omni-directional radiation source to emit radiation about the radiation source, at least a portion of which includes ultraviolet c-band radiation;
detecting the ultraviolet c-band radiation using one-bit ultraviolet c-band detector; and
generating a stimulus in response to detected ultraviolet c-band radiation including at least one of: generating a vibration stimulus, generating an audio stimulus, and generating a visual stimulus.

8. The method of claim 7, wherein a substantial portion of the radiation is ultraviolet c-band radiation.

9. The method of claim 7, wherein the radiation source is at least one of: a light-emitting diode, and a gaseous discharge tube.

10. The method of claim 9, wherein the gaseous discharge tube is Xenon or a Mercury discharge tube.

11. The method of claim 7, wherein the ultraviolet c-band detector is an imager.

12. The method of claim 7, further comprising:
rendering an image to a user, the image comprising:
an ultraviolet c-band portion to represent the detected ultraviolet c-band radiation; and
a visible light portion to represent an environment of the rescue beacon.

13. A system for search and rescue, comprising:
a rescue beacon coupled to a moving body, comprising:
an omni-directional radiation source to emit radiation about the rescue beacon, at least a portion of which includes ultraviolet c-band radiation, wherein the radiation source is at least one of: a light-emitting diode and a gaseous discharge tube;
an ultraviolet c-band detector to detect the ultraviolet c-band radiation to enable locating of the rescue beacon; and
a stimulus generator that generates a stimulus in response to detected ultraviolet c-band radiation,
wherein the stimulus generator is one of: a vibration generator, an audio generator, and a visual generator.

* * * * *